United States Patent
Hahn et al.

(10) Patent No.: US 9,308,931 B2
(45) Date of Patent: Apr. 12, 2016

(54) ASSEMBLY COMPRISING A FIRST CAM CARRIER

(75) Inventors: Michael Hahn, Au (CH); Martin Fleischer, Balgach (CH)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 0 days.

(21) Appl. No.: 14/349,813

(22) PCT Filed: Aug. 16, 2012

(86) PCT No.: PCT/EP2012/003485
§ 371 (c)(1),
(2), (4) Date: Jul. 15, 2014

(87) PCT Pub. No.: WO2013/050095
PCT Pub. Date: Apr. 11, 2013

(65) Prior Publication Data
US 2014/0318304 A1  Oct. 30, 2014

(30) Foreign Application Priority Data
Oct. 5, 2011 (DE) .......................... 10 2011 054 196

(51) Int. Cl.
*B62D 1/184* (2006.01)
*F16H 25/18* (2006.01)

(52) U.S. Cl.
CPC .............. *B62D 1/184* (2013.01); *F16H 25/186* (2013.01)

(58) Field of Classification Search
CPC ................................ B62D 1/184; F16H 25/186
See application file for complete search history.

(56) References Cited

U.S. PATENT DOCUMENTS

| 2002/0023515 | A1* | 2/2002 | Kuroumaru et al. | 74/493 |
| 2007/0234845 | A1* | 10/2007 | Gist et al. | 74/569 |
| 2011/0064538 | A1 | 3/2011 | Oertle et al. | |
| 2011/0156380 | A1* | 6/2011 | Dietz et al. | 280/775 |
| 2011/0174028 | A1 | 7/2011 | Bahr et al. | |
| 2012/0247258 | A1* | 10/2012 | Maniwa et al. | 74/493 |
| 2013/0255430 | A1* | 10/2013 | Moriyama et al. | 74/493 |
| 2015/0068353 | A1* | 3/2015 | Mihara et al. | 74/493 |

FOREIGN PATENT DOCUMENTS

| CN | 201321071 | 10/2009 |
| CN | 201484477 | 5/2010 |

(Continued)

OTHER PUBLICATIONS

Machine translation of WO2009141045. Retrieved Jun. 29, 2015.*

(Continued)

*Primary Examiner* — Barry Gooden, Jr.
(74) *Attorney, Agent, or Firm* — Wenderoth, Lind & Ponack, L.L.P.

(57) ABSTRACT

An assembly includes a first cam carrier and at least one other cam carrier for a securing device for an adjustable steering column of a motor vehicle. Each of the cam carriers has at least one cam, and the carriers are located opposite one another so that they can rotate against one another about a rotational axis. When the first cam carrier rotates against the other cam carrier through a rotational angle about the rotational axis, the cam of the first cam carrier rests on and glides along the cam of the other cam carrier on a contact path. The contact path runs at a radial distance from the rotational axis, and the distance altering depends on the rotational angle.

14 Claims, 3 Drawing Sheets

(56) References Cited

FOREIGN PATENT DOCUMENTS

| | | |
|---|---|---|
| CN | 102076548 | 5/2011 |
| EP | 1 180 466 | 2/2002 |
| EP | 2 055 612 | 5/2009 |
| JP | 2003-231470 | 8/2003 |
| JP | 2005-231545 | 9/2005 |
| JP | 2006-131211 | 5/2006 |
| WO | 2009/141045 | 11/2009 |

OTHER PUBLICATIONS

International Search Report (ISR) issued Mar. 21, 2013 in International (PCT) Application No. PCT/EP2012/003485.
Partial Chinese Search Report dated Sep. 6, 2015 issued in parallel Chinese Patent Application No. 2012800486220.

* cited by examiner

ASSEMBLY COMPRISING A FIRST CAM CARRIER

BACKGROUND OF THE INVENTION

The present invention relates to an assembly comprising a first cam carrier and at least one further cam carrier for a securement device for an adjustable steering column for a motor vehicle. Each cam carrier includes at least one cam, and the cam carriers are disposed opposite to one another such that they are rotatable against one another about a rotational axis. Upon the first cam carrier being rotated out of position against the further cam carrier along a turning angle about the rotational axis, the cam of the first cam carrier comes to rest glidingly on the cam of the further cam carrier along a contact path.

Generic assemblies are employed in securement devices or clamping devices for adjustable steering columns for motor vehicles. By means of a lever, most often manually operatable, the cam carriers can be rotated out of position against one another. In a first position, the securement device is subsequently in an open position in which the steering shaft, and therewith the steering wheel attached on the steering column, can be adjusted in the height and/or length position in order to adapt the position of the steering wheel to the position of the particular driver. Within the prior art, different cam carriers are known in which the cams are formed out differently, thus have a cam contour differing from one another. There is frequently also reference made to a cam or cam carrier and a cam follower cooperating therewith. However, this is merely a linguistic convention. In the final analysis the cam carriers and cam followers involve each a cam carrier with corresponding cams.

A general problem in the preparation or outforming of the cams consists in providing on a shortest possible displacement path or turning angle the largest possible pressing force for arresting the securement device in its closed position. The manual force, which is required for the actuation of the lever of the securement device, is simultaneously to be kept at the lowest possible level and convey the impression of a comfortable and easy actuation. Furthermore, the wear on the cam is to be kept as low as feasible.

For an improvement of the operatability of the cam surface, EP 1 180 466 proposes implementing the cam surface with a multiplicity of sloping ramps whose slopes differ in order to attain as uniform as possible a transition of the manual force as a function of the turning angle and therewith of the clamping force. Within prior art, moreover, there are known general curveform ramps, thus, for example, as disclosed in JP 2003-231470A. In JP 2005-231545A a cam ramp is also described.

According to JP 2006-131211A the specific required clamping force is to be represented with an optimized manual force progression. For this purpose JP 2006-131211A proposes implementing the contact faces between cams and cam follower, which, in the closed state of the clamping system, are in engagement with one another, such that the clamping progression on the contact face is as uniform as possible along a line extending outwardly from the rotational center or the rotational axis of the cam carrier. For this purpose, the cam contact is initially closed starting from the radially outer end. According to this document, the elastic deformations in the cam are correspondingly larger than the thermal expansions of the structural parts anticipated during operation. Due to the elastic deformations anticipated from the outset and the only minor values of the superelevation, this technical solution makes high demands of the precision of the individual structural parts and therewith of the fabrication tolerances. Moreover, the durability of cam carrier and cams can only be attained with high expenditures since specific elastic deformations are provided in order to attain the uniform force progression.

All of the prior art listed above have in common that the manual force progression can only be optimized within narrow limits.

SUMMARY OF THE INVENTION

The invention therefore addresses the problem of providing a generic assembly in which the force progression during the turning of the cam carriers against one another about the rotational axis can be optimally adapted to the requirements.

It is thus provided that the contact path progresses at a radial distance from the rotational axis varying as a function of the turning angle. The contact path and the cam geometries and contacts can advantageously be described in polar coordinates by the turning angle and the distance in the radial direction from the rotational axis.

Stated differently, it is consequently a fundamental concept of the invention, viewed in the radial direction, to shape the distance of the contact between the two cams, thus the contact path from the rotational center or from the rotational axis, such that it is variable over the progression of the contact path. It can therefore be provided in particular that the radial distance of the contact path over the entire turning angle either increases continuously or decreases continuously in order to attain the desired force progression upon the turning of the cam carriers of the assembly against one another during the closing and/or the opening process of the securement device.

The term "contact path" means the region of a cam carrier or cam which in the progression of the actuation of the securement device is in contact with the other cam carrier or cam, wherein via this contact the clamping force of the securement device is transmitted, or the cam control of the securement device takes place.

In terms of a path having a longitudinal extent or progression, the contact path can develop on both of the cams gliding along one another or only on one of these two cams. It is in any case advantageous if the cam of the first cam carrier and the cam of the further cam carrier are only in contact with one another in the region of the contact path. Staying in contact is herein understood to mean staying in physical contact, thus being in contact on one another. Depending on the outforming of the cams in contact with one another, the contact path can be developed in the form of a line or also have a certain width viewed in the radial direction with respect to the rotational axis. If the contact path has a width exceeding a line, then for the determination of the change of the radial distance of the contact path from the rotational axis as a function of the turning angle, the center, viewed in the radial direction, of the contact path, must be taken into consideration. Stated differently, if there is doubt, the radial distance of the contact path from the rotational axis between the center, viewed in the radial direction, of the contact path and the rotational axis must be measured. In order to keep the abrasion on the cams gliding along one another to a minimum during long-term use of the assembly according to the invention, preferred embodiments of the invention provide that, viewed in the radial direction with respect to the rotational axis, the width of the contact path varies as a function of the turning angle. In regions in which the wear and tear or the abrasion is especially high, the premature attrition of the cams can be counteracted through the correspondingly greater width of the contact path. After multiple uses of the securement device, the contact path is detectable as a stress mark on at least one cam carrier or cam.

It is especially preferred for it to be provided that the cams, gliding on one another when they are in contact with one another, are at least regionally in contact on one another over their entire surface or fully linearly, and not only selectively at some points. It can be especially advantageous in these terms if, even when the cams are in the relieved state, the contact path extends preferably over its entire longitudinal extent on one of the cams, viewed in a planar section along the rotation axis, parallel to the contact path on the other cam. In such implementations, the cams are in contact on one another over the entire surface or fully linearly even if they are only pressed onto one another at low forces or were to lie only loosely in contact on one another.

In this context, it is also advantageous if the contact path, preferably over its entire longitudinal extent, extends or is oriented on at least one of the cams, preferably on both of the cams in contact with one another, viewed in a planar section along the rotational axis, orthogonally with respect to the rotational axis. The cams are preferably developed on the particular cam carriers as projections, implemented such that they are facing one another and in the direction parallel to the rotational axis, of the particular cam carrier. Stated differently, the cams thus involve a type of mountain range which projects beyond the remaining contour of the cam carrier in the direction parallel to the rotational axis. The projections or cams can be formed out integrally in one piece with the cam carrier. However, the cams can also be subsequently secured in position on a base cam carrier body by means of bolting, riveting, welding, pressing together or the like.

For the sake of completeness, reference is made to the fact that it is advantageously provided that preferably each of the contact paths is disposed on that surface of at least one of the cams that face the cam of the other cam carrier. It is conceivable and feasible to develop a contact path on both cams. In order to be able to vary according to the invention the radial distance of the contact path as a function of the turning angle, pockets can be worked into at least one of the cams. These pockets can also be referred to as indentations or recesses. By introducing pockets the contact between the two cams in the region of the pockets is prevented.

It is provided with special advantage that the radial distance of the contact path from the rotational axis is minimal at one end of the contact path. The cams are in this case advantageously in contact on one another at this end of this contact path when the securement device is in its closed position in which the adjustable steering column or the steering wheel secured thereon is arrested in its position. In this region has already been applied the full tightening force and it is only for this reason that a further turning of the manually operatable lever or tightening lever takes place in order to be able to secure the position of the tightening lever better in its end position. Through this measure, it becomes possible to convey to the driver in this last region a perception of "snapping in". However, no degradation of the clamping force occurs in the securement device. This perception of "snapping in" is also given if in reality the actuation force on the manually operatable lever does not decrease but rather only remains the same since shortly before this transition the clamping force has increased very strongly.

In addition to the above assembly, the invention also relates to a securement device for an adjustable steering column of a motor vehicle comprising an assembly according to the invention. In this securement device the cam carriers can be disposed such that they are turnable against one another about the rotational axis on a clamp bolt of the securement device. In such embodiments, it is especially preferred that the clamp bolt penetrates the cam carriers coaxially with respect to the rotational axis. One of the cam carriers or cams, also referred to as cam follower, is connected torsion-tight with the clamp bolt. The further or additional cam carriers in this case can be fixed on a, for example body-stationary, structural part fixed on the remaining securement device.

The securement device comprises advantageously a manually operatable lever. The lever can be connected with one of the cam carriers, for example, via the clamp bolt.

It is alternatively also conceivable and feasible to connect one of the cam carriers, or cams, at least torsion-tight with the lever and to place it onto the clamp bolt such that it is rotatable about the axis of the clamp bolt. Decisive is only that the cam can be driven turnably with respect to the cam follower (or, stated differently, the two cams with respect to one another).

However, for the sake of completeness, reference is made to the fact that the invention can be employed not only in the case of securement devices manually operatable via a lever, but also in motor-driven securement devices in which the cam carriers are turned against one another by means of a motor.

Apart from the assembly of the securement device, the invention also relates to an adjustable steering column for a motor vehicle with a securement device according to the invention. Adjustable steering column, in particular also a steering column adjustable in height and length, is generally understood to mean a steering column known within prior art in which the position of the steering wheel attached on the steering column or its steering shaft can be adapted to the particular driver. The adaptation or adjustment of the steering column in this case, as a rule, takes place with an opened securement device. If the securement device is brought into its closed position, the position of the steering column or its steering shaft, and therewith of the steering wheel, is fixed. In such steering columns according to the invention, the energy absorption mechanisms known per se in the prior art for the event of a crash can be integrated.

BRIEF DESCRIPTION OF THE DRAWINGS

Further features and details of preferred embodiments of the invention will be explained in conjunction with the following description in connection with the drawings, in which.

DETAILED DESCRIPTION OF THE INVENTION

Figure 1:
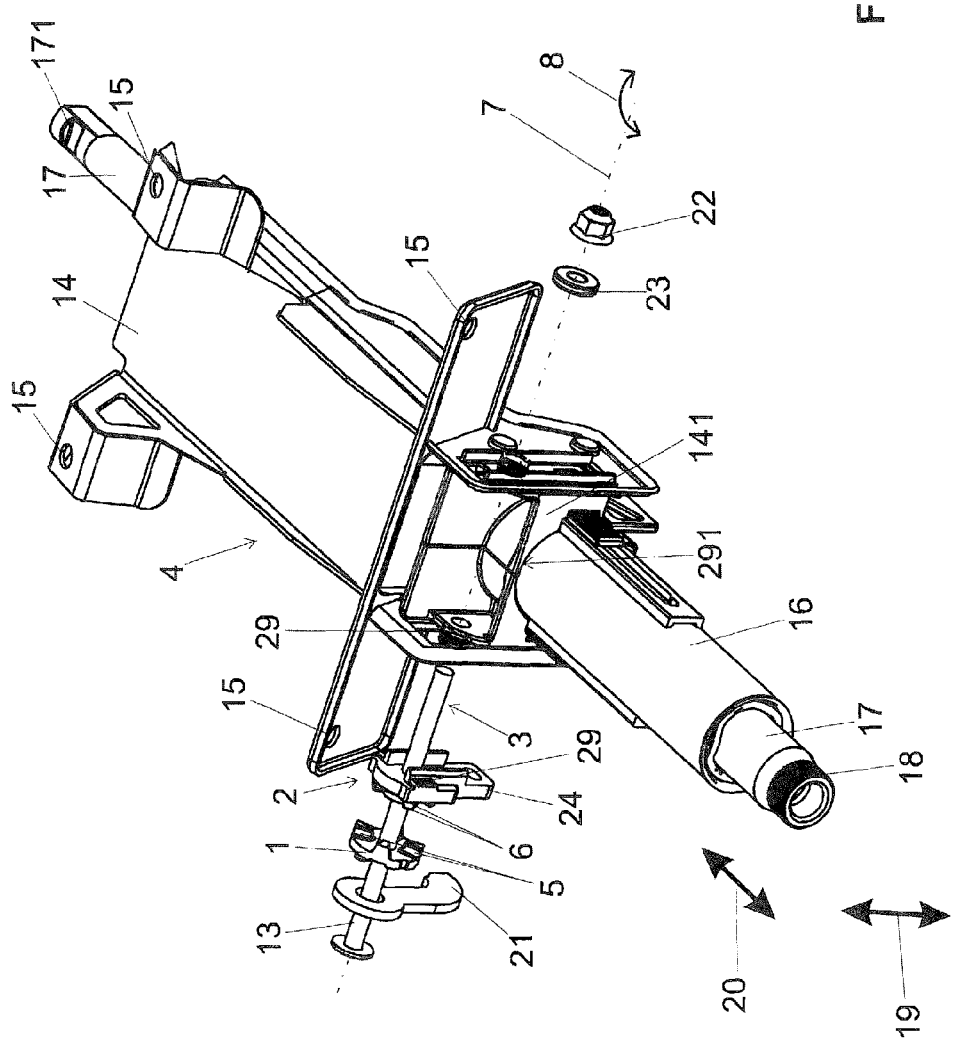
FIG. 1 shows an adjustable steering column equipped according to the invention for a motor vehicle.
Figure 3:
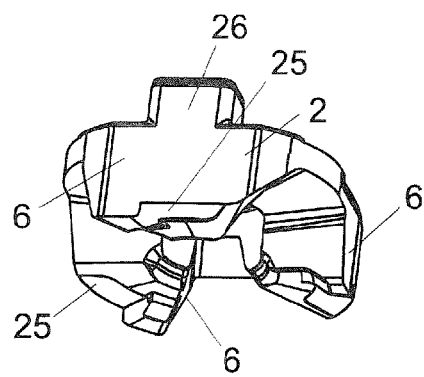
FIGS. 3 to 6 shows the further or additional cam carrier in different views applied in FIG. 1.
Figure 4:
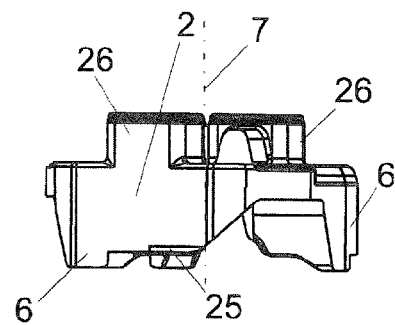
Figure 5:
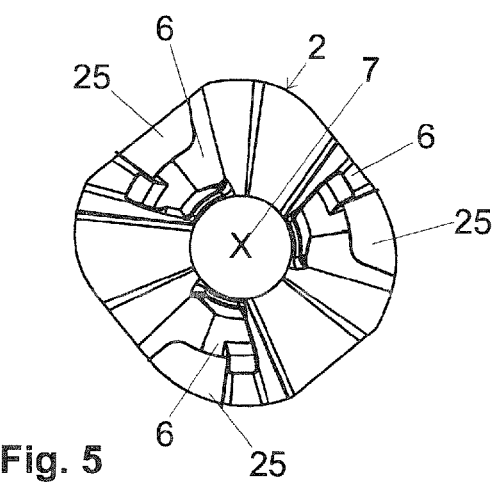

FIG. 1 shows an adjustable steering column implemented according to the invention, wherein, first, the features known in prior art per se of this steering column 4 will be briefly described without indicating thereby that in steering columns 4 according to the invention these features known per se in prior art must be realized.

In the embodiment depicted in FIG. 1, the adjustable steering column 4 comprises a support unit 14 which is secured on the body of a motor vehicle by of the mounting plates 15. On the support unit 14, optionally via a corresponding intermediate lever known per se, a steering shaft bearing unit 16 is displaceably bearing supported. For the adjustment, first the securement device 3 must be brought into its open position. In this open position of the securement device 3, the steering shaft bearing unit 16, together with steering shaft 17, can be adjusted in the length and/or height direction. In the depicted embodiment both adjustment directions are possible. Double arrow 19 shows the possible directions in the height adjustment. Double arrow 20 shows the directions in the length adjustment. On a steering wheel adapter 18 the steering wheel, not shown here, can be secured on the steering shaft 17. On the front end 171 of the steering shaft can be disposed a universal joint or a steering gearing, for example with electric auxiliary boost known by the term "Colpas" [Column-integrated Power Assisted Steering].

Once the desired adjustment of the position of the steering shaft bearing unit 16, and therewith of the steering wheel, has been completed, the securement device 3, shown here in exploded view, is again brought into its closed position in which the position of the steering shaft bearing unit 16 is fixed relative to the support unit 14 and therewith to the body of the motor vehicle. In the depicted embodiment, the securement device 3 is displaced between its open position and its closed position by a lever 21 only shown shortened here. The lever 21 in the depicted embodiment is turnable together with one of the cam carriers 1 or 2, here together with the cam carrier 1, about the rotational axis 7 extending in this embodiment coaxially through the clamp bolt 13. The further cam carrier 2 in this embodiment is secured torsion-tight on the support unit 14 via the intermediate element 24. By turning the lever 21 together with the first cam carrier 1, the cam carrier 1 and the further cam carrier 2 are turned relative to one another about the rotational axis 7 through a correspondingly predetermined turning angle 8 against one another. The clamp bolt 13 of this embodiment is secured on the side opposite to lever 21 by washer 23 and counternut 22. The washer can also be replaced by an axial bearing. The first cam carrier 1 in this embodiment comprises integrally formed-on cams 5 and the further cam carrier 2 also comprises integrally formed-on cams 6. The cam carriers 1 and 2 are disposed opposite one another and turnable against one another about the rotational axis 7. Upon the turning of the first cam carrier 1 against the further cam carrier 2 along the turning angle 8 about the rotational axis 7, the cams 5 of the first cam carrier 1 are in contact on one of the cams 6 of the further cam carrier 2 such that they glide on a contact path 9 along one another. For the sake of completeness, reference is made to the fact that the number of cams 5 or 6 disposed on a particular cam carrier 1 or 2 can vary. The minimum in each case is a single cam 5 or 6 for each cam carrier 1 or 2, respectively. In the depicted embodiment, three cams 5 or 6 each are disposed on a particular cam carrier 1 or 2, respectively. However, as stated, the number of cams per cam carrier can vary. It is in any case advantageous if one cam 5 of the first cam carrier 1 cooperates with one cam 6 of the further cam carrier 2.

For the sake of completeness, reference is made to the fact that assemblies according to the invention of cam carriers 1 and 2 can be applied in securement devices 3 operating under frictional closure as well as also in those operating under form closure. In the depicted embodiment, the toothings 29 reveal that here, with respect to the height adjustment in the direction of double arrow 19, a securement device 3 is involved that operates under form closure and, in the direction of the length adjustment in the direction of the double arrow 20, a connection under frictional closure along the contact faces 291 between the intermediate lever 141 and the steering shaft bearing unit 16 is involved.

Figure 2:
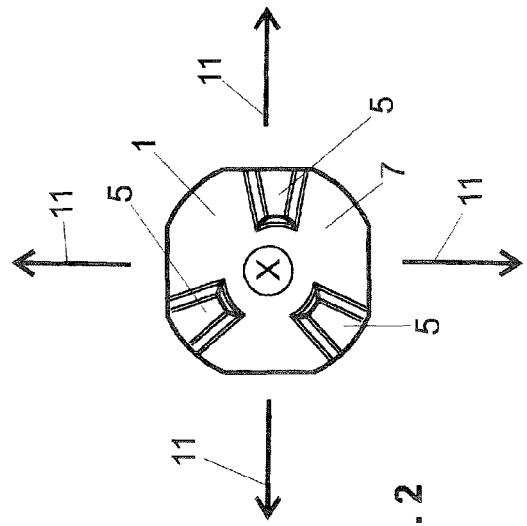
FIG. 2 shows the first cam carrier applied in FIG. 1.

FIG. 2 shows a top view onto the cams 5 of the first cam carrier 1. Drawn in is also the rotational axis 7, about which the cam carriers 1 and 2 are turned against one another through the actuation of the manual operation lever 21, as well as the radial direction 11. FIGS. 3 to 6 show the counterpiece, thus the further cam carrier 2 with its cams 6. On the backside opposite the cams 6 of the further cam carrier 2, two fixing pegs 26 are provided in the depicted embodiment, which pegs as anti-twist protection engage in the depicted embodiment into corresponding recesses in the intermediate element 24. In order to realize in the cooperation with the cams 5 of the first cam carrier 1, the radial distance 10, varying according to the invention, of the contact path 9 from the rotational axis 7 as a function of the turning angle 8, in the depicted embodiment pockets or indentations 25 are provided in the cams 6 or in their surfaces.

Figure 6:
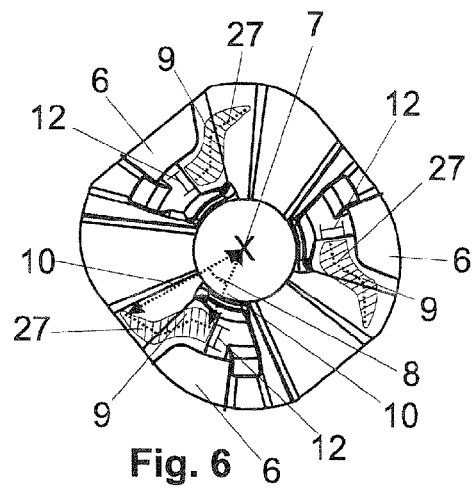

FIG. 6 shows a top view onto the cams 6 or their surfaces. In this top view the contact paths 9 are also drawn. In this top view according to FIG. 6, the radial distance 10 between the contact path 9 and the rotational axis 7 is clearly visible varying over the progression of the turning angle 8. In the depicted variant, the contact paths 9 have a width 12 going beyond a line form, which width in this embodiment also varies over the longitudinal extent of the contact path 9.

Figure 7:
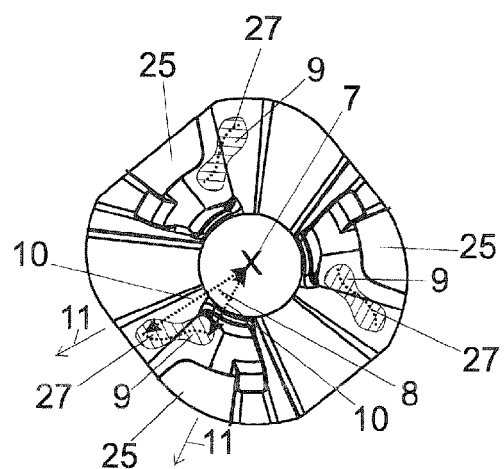
FIG. 7 shows an alternative embodiment of a further cam carrier according to the invention.

In those cases in which the width 12 of the contact path 9 in the radial direction cannot be regarded as negligible, the distance 10 between contact path 9 and rotational axis 7 is determined with the aid of the center line 27, determined in reference to the radial direction 11, of the contact path 9. This is also drawn in this manner, by example, in FIGS. 6 and 7. While in FIG. 6 the center line 27, and therewith also the contact path 9 shown hatched, extends relatively angularly, in FIG. 7 a second variant is shown, in which the variations of the radial distance 10 are, in different radii, selectively rounded-off. It is, of course, moreover also conceivable and feasible to realize other progressions of contact paths 9, for example in order to attain in the region of the greatest slope of the cam ramp a mitigation of the force required on the lever 21. The layout should herein take place as a function of the material properties of the cams 5 and 6 or their cam carriers 1 and 2. The particular surface pressures should be dimensioned such that the cam pairings are continuously sustainable.

Figure 8:
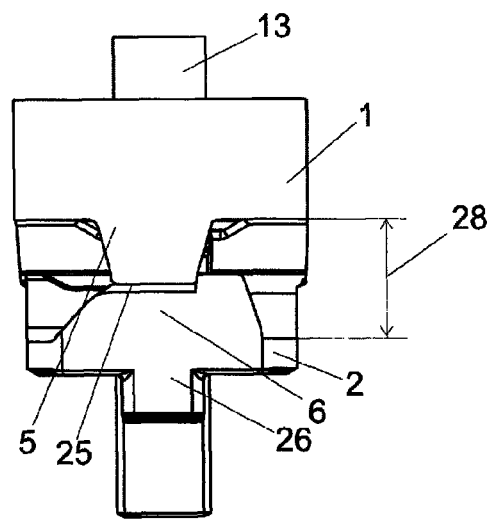
FIGS. 8 to 10 show different positions of the cam carriers relative to one another at different turning angles.
Figure 9:
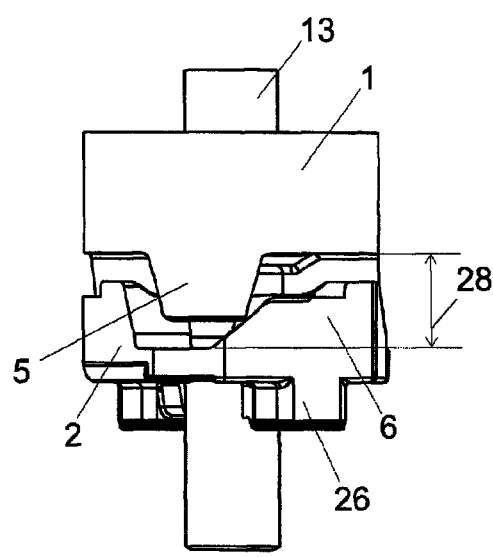
Figure 10:
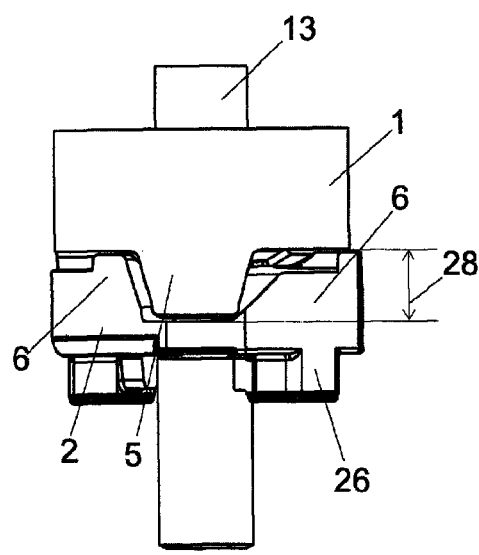

FIGS. 8 to 10 depict side views onto the cam carriers 1 and 2 disposed opposite one another and the clamp bolt 13 centrally fed through them, wherein the two cam carriers 1 and 2, and therewith also their cams 5 and 6, in the several depictions of FIGS. 8, 9 and 10 are disposed at different turning angles 8 relative to one another. The distance 28 between the two cam carriers 1 and 2 also varies correspondingly. The situation according to FIG. 8 corresponds to the closed position of the securement device 3 in which the steering shaft bearing unit 16 is fixed in its position relative to the support unit 14. FIG. 10 shows the open position of the securement device 3 in which a displacement of the steering shaft bearing unit 16 into at least one of the directions 19 and 20 relative to the support unit 14 is feasible. FIG. 9 shows an intermediate position.

Figure 11:
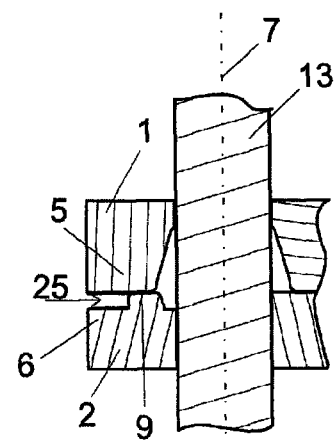
FIG. 11 is a schematic longitudinal section view along the rotational axis through the cam carriers and the clamp bolt.

FIG. 11 shows a planar section along the rotational axis 7 through the assembly of the two cam carriers 2 and the clamp bolt 13. It is here clearly visible that the contact path 9 on one of the cams 5 extends preferably parallel to the contact path 9 on the other cam 6. It can also be seen that, viewed in this section, the contact path extends orthogonally to the rotational axis 7, as is the case in preferred embodiments. FIG. 11 shows the stressed state in which the clamping system is in its closed position. The parallel progression of the contact path 9 on the two cams 5 and 6, however, is also advantageously given in the relieved state which overall leads to the continuous resting on one another over the full surface of the two cams 5 and 6 in the region of the contact path 9 when the cams 5 and 6 are in contact with one another.

LEGEND TO THE REFERENCE NUMBERS

1 First cam carrier
2 Further cam carrier
3 Securement device
4 Steering column
5 Cam
6 Cam
7 Rotational axis
8 Turning angle
9 Contact path
10 Radial distance
11 Radial direction
12 Support unit
15 Mounting plates
16 Steering shaft bearing unit
17 Steering shaft
18 Steering wheel adapter
19 Direction
20 Direction
21 Manual operating lever
22 Counternut
23 Washer
24 Intermediate element
25 Pocket or recess or indentation
26 Fixing peg
27 Center line
28 Distance
29 Toothing
141 Intermediate lever
171 End
291 Contact face

The invention claimed is:

1. An assembly comprising a first cam carrier and a second cam carrier for a securement device for an adjustable steering column of a motor vehicle, wherein the first and second cam carriers each comprise a cam and the first and second cam carriers are disposed opposite one another and turnably against one another about a rotational axis, and the first and second cam carriers are configured such that, upon turning of the first cam carrier against the second cam carrier along a turning angle about the rotational axis, the cam of the first cam carrier is glidingly in contact on the cam of the second cam carrier along a contact path, wherein the contact path extends at a radial distance from the rotational axis varying as a function of the turning angle.

2. The assembly as in claim 1, wherein the cam of the first cam carrier and the cam of the second cam carrier are exclusively in a region of the contact path in contact with one another.

3. The assembly as in claim 1, wherein, viewed in a radial direction with respect to the rotational axis, a width of the contact path varies as a function of the turning angle.

4. The assembly as in claim 1, wherein when the respective cams of the first and second cam carriers are in a relieved state, the contact path extends on the cam of the first cam carrier, viewed in planar section along the rotational axis, parallel to the contact path on the cam of the second cam carrier.

5. The assembly as in claim 4, wherein when the respective cams of the first and second cam carriers are in the relieved state, the contact path extends on the cam of the first cam carrier over its entire longitudinal extent when viewed in the planar section along the rotational axis.

6. The assembly as in claim 1, wherein the contact path on the respective cam of at least one of the cam carriers in contact with one another extends, viewed in a planar section along the rotational axis, orthogonally to the rotational axis.

7. The assembly as in claim 6, wherein the contact path on the cams of the first and second cam carriers in contact with one another extends, over its entire longitudinal extent, orthogonally to the rotational axis when viewed in the planar section along the rotational axis.

8. The assembly as in claim 1, wherein the cams on the respective cam carriers are projections configured such that they face one another and face in a direction parallel to the rotational axis of a first one of the first and second cam carriers.

9. The assembly as in claim 8, wherein the contact path is disposed on a surface of the cam facing the cam of the second one of the first and second cam carriers.

10. The assembly as in claim 9, wherein the contact path is in each instance disposed on a surface facing the cam of the second one of the first and second cam carriers.

11. A securement device for an adjustable steering column of a motor vehicle with an assembly according to claim 1.

12. An adjustable steering column for a motor vehicle with a securement device according to claim 11.

13. The securement device as in claim 11, wherein the cam carriers are disposed on a clamp bolt of the securement device such that the cam carriers are turnable against one another about the rotational axis.

14. The securement device as in claim 13, wherein the clamp bolt penetrates through the first and second cam carriers coaxially to the rotational axis.

* * * * *